United States Patent
Bevan et al.

(10) Patent No.: US 8,386,791 B2
(45) Date of Patent: Feb. 26, 2013

(54) SECURE DATA PROCESSING METHOD BASED PARTICULARLY ON A CRYPTOGRAPHIC ALGORITHM

(75) Inventors: Régis Bevan, Les Ulis (FR); Christophe Giraud, Pessac (FR); Hugues Thiebeauld De La Crouee, Bordeaux (FR)

(73) Assignee: Oberthur Technologies, Levallois-Perret (FR)

(*) Notice: Subject to any disclaimer, the term of this patent is extended or adjusted under 35 U.S.C. 154(b) by 118 days.

(21) Appl. No.: 10/592,070

(22) PCT Filed: Mar. 7, 2005

(86) PCT No.: PCT/FR2005/000539
§ 371 (c)(1),
(2), (4) Date: Nov. 8, 2006

(87) PCT Pub. No.: WO2005/088895
PCT Pub. Date: Sep. 22, 2005

(65) Prior Publication Data
US 2007/0177720 A1    Aug. 2, 2007

(30) Foreign Application Priority Data
Mar. 11, 2004  (FR) .................... 04 02548

(51) Int. Cl.
*H04L 9/32* (2006.01)
*H04L 9/00* (2006.01)
*G06F 7/38* (2006.01)
*H04K 1/00* (2006.01)
*H04L 9/28* (2006.01)

(52) U.S. Cl. .......... 713/179; 713/189; 380/268; 380/28; 708/490

(58) Field of Classification Search .................. 708/490; 380/28
See application file for complete search history.

(56) References Cited

U.S. PATENT DOCUMENTS

| 5,243,607 | A | * | 9/1993 | Masson et al. ............ 714/49 |
| 6,101,254 | A | * | 8/2000 | Thiriet ...................... 380/2 |
| 6,108,419 | A | | 8/2000 | Barker et al. |
| 6,278,783 | B1 | * | 8/2001 | Kocher et al. .............. 380/277 |

(Continued)

FOREIGN PATENT DOCUMENTS

| FR | 2 819 663 | 7/2002 |
| FR | 2 838 262 | 10/2003 |
| WO | WO 99/48239 | 9/1999 |

OTHER PUBLICATIONS

Goubin, "A Sound Method for Switching between Boolean and Arithmetic Masking," *Cryptographic Hardware and Embedded Systems 2001*, vol. 2162 of *Lecture Notes in Computer Science*, pp. 3-15.

(Continued)

*Primary Examiner* — Nathan Flynn
*Assistant Examiner* — Trang Doan
(74) *Attorney, Agent, or Firm* — Young & Thompson

(57) ABSTRACT

The invention relates to a secure data processing method comprising the steps of generating (E204; E304) a first random value (A1); executing (E206; E306) a first cryptographic algorithm ($F_K$) using the first random value (A1); generating (E208; E308) a second random value (A2); executing (E210; E310) a second cryptographic algorithm ($F_K$; $G_K$) using the second random value (A2); and generating a result (V) to verify that the first algorithm ($F_K$) was properly executed.

21 Claims, 3 Drawing Sheets

U.S. PATENT DOCUMENTS

| | | | |
|---|---|---|---|
| 6,295,606 B1 * | 9/2001 | Messerges et al. | 713/189 |
| 7,243,240 B2 * | 7/2007 | Wang | 713/189 |
| 7,599,491 B2 * | 10/2009 | Lambert | 380/30 |
| 2001/0053220 A1 * | 12/2001 | Kocher et al. | 380/29 |
| 2003/0190043 A1 * | 10/2003 | Sigbjornsen et al. | 380/201 |
| 2004/0193987 A1 * | 9/2004 | Sigbjornsen et al. | 714/741 |
| 2005/0076335 A1 * | 4/2005 | Cavage et al. | 718/100 |

OTHER PUBLICATIONS

Piret et al., "A Differential Fault Attack Technique against SPN Structures, with Application to the AES and Khazad," *Cryptographic Hardware and Embedded 2003*, vol. 2779 of *Lecture Notes in Computer Science*, pp. 77-88.

* cited by examiner

SECURE DATA PROCESSING METHOD BASED PARTICULARLY ON A CRYPTOGRAPHIC ALGORITHM

The present invention relates to a secure data processing method based in particular on a cryptographic algorithm.

In some applications a data processing method uses a cryptographic algorithm to generate output data from input data using a secret key. The secret key is stored in a microcircuit card, for example, such as a microchip card. In this case a cryptographic algorithm may be executed in a microprocessor carried by the microchip card.

Attempts have already been made to protect this type of method against attacks aimed at determining the secret key.

Such attacks are for instance attacks known as SPA (from the English: "Simple Power Analysis") or DPA (from the English: "Differential Power Analysis") which essentially consist in measuring the current drawn when executing the cryptographic algorithm in order to deduce the secret key.

To combat this type of attack it has already been proposed, for example in the patent application WO 99/48239, to use a masking technique. According to this technique a random number is generated from which a mask is derived, after which the mask is combined during execution of the cryptographic algorithm with the input data (or where applicable intermediate data), for example by means of the "exclusive-OR" (XOR) logic operator. A subsequent step of the cryptographic algorithm, for example at the end of the algorithm, combines the data obtained with a mask, producing the output data that would have been obtained with no masking. However, the intermediate data of the cryptographic algorithm, and thus the measurable currents, are modified by the random number (mask) and so the secret key cannot be deduced from observing them.

In the case of a DES (from the English: Data Encryption Standard) type method, masking may, for example, involve modifying certain calculation steps and certain data structures with use of the random number, in particular the S-boxes.

If the cryptographic algorithm executes a plurality of sub-algorithms, it is possible to use a plurality of different random numbers, for example a random number for each sub-algorithm. However, in a restricted resources environment such as a microcircuit card, in order to accelerate the processing of the data, a single random number is used for the whole of the algorithm to obtain output data from input data, as mentioned in the patent application WO 99/48239. This is because obtaining the random number and modifying the S-boxes in the case of the DES method necessitate a time equivalent to the cryptographic algorithm stricto sensu.

In the context of the masking technique that has just been explained, other solutions are known in the art for protecting a cryptographic algorithm against SPA and DPA attacks by using a random number during execution of the algorithm. The patent application FR 2 820 577, which proposes masking the derivation of the secret key, is another example of this type of solution.

Another family of attacks is that of DFA (from the English: "Differential Fault Analysis") attacks. These attacks consist in generating faults during the execution of the cryptographic algorithm, for example by interfering with the electronic component on which it is executed. Such an interference may for instance be achieved by briefly illuminating the electronic component with a light source or by generating voltage peaks at the terminals of the component beyond its specifications. This interference induces an error in the results of the cryptographic algorithm, which in some cases facilitates the attacker obtaining the secret key.

Given the differences in kind between attacks of this type and SPA and DAP attacks, the countermeasures described above (masking techniques) do not permit thwarting DFA attacks.

To respond to DFA attacks, new techniques for securing the cryptographic algorithm have therefore had to be proposed.

One of these techniques consists in executing the cryptographic algorithm a first time and then executing a second cryptographic algorithm the result whereof permits verifying that the first algorithm was executed without fault. Such an approach is for example described in the patent application FR 2 838 262.

The second cryptographic algorithm used may be identical to the first cryptographic algorithm, in which case the second algorithm is applied to the input data and correct execution of the first algorithm is verified by comparing the results of the two algorithms. Alternatively, the second cryptographic algorithm may be the inverse algorithm of the first cryptographic algorithm (when such an inverse algorithm exists), in which case the second algorithm is applied to the output data obtained by the first algorithm and it is verified that the result of the second cryptographic algorithm indeed corresponds to the input data of the first cryptographic algorithm. Thus it is verified here also that the first algorithm was executed without fault.

This solution, used as such, is not, however, protected against a specific type of DFA attacks in which the same error is generated twice or an error and another error that is its complement are generated. In fact, in this case, the data calculated during the first cryptographic algorithm and the data calculated during the second cryptographic algorithm are modified by the attack in a similar manner. The faults generated by the attack are then not detectable simply by comparing the data involved in these algorithms.

To obtain protection against this latter type of attacks, the invention proposes a secure data processing method comprising the following steps:

generation of a first random value;
execution of a first cryptographic algorithm using the first random value;
generation of a second random value;
execution of a second cryptographic algorithm using the second random value and generating a result permitting the verification of the correct execution of the first algorithm.

Accordingly, even if both cryptographic algorithms are each subjected to a fault of the same type with the aim of obtaining the forced equality between the first datum and the verification datum and thereby preventing the detection of the attack, the faults will in fact have different consequences because of the use of two different random values and the attack will therefore be detected.

These steps are of course not necessarily executed in the order in which they are described above: the generation of the second random value may be carried out before the execution of the first cryptographic algorithm.

Moreover, random value here means a value of the same type as that generated by a processor with the aim of it being unpredictable by any user of the system (sometimes call a pseudo-random value).

When execution of the first cryptographic algorithm involves in at least one calculation a first datum and generates an output datum from an input datum and the result is a verification datum, the method includes for example a step of comparison of the verification datum to the first datum for verification of the correct execution of the first algorithm.

Naturally, the data used, and in particular the first datum and the output datum, may be intermediate data of a cryptographic algorithm.

In a first embodiment, the second algorithm is identical to the first algorithm and is applied to the input datum and said first datum is the output datum.

In a second embodiment, the second algorithm is the inverse algorithm of the first algorithm and is applied to the output datum and said first datum is the input datum.

These embodiments are practical to use because of the identity (first embodiment) or the proximity (second embodiment) of the two algorithms.

Alternatively, the first datum is an intermediate datum used during the first cryptographic algorithm. The second cryptographic algorithm may then correspond to only a portion of the first cryptographic algorithm.

The first cryptographic algorithm is for example a symmetrical key cryptographic algorithm. It may be more precisely an algorithm of the DES type or of the AES type.

In accordance with these possibilities, the derivation of the key may be masked by means of the first random value.

More generally, the first cryptographic algorithm may be an algorithm of the DES type or of the AES type masked by means of the first random value.

In one possible embodiment, the first cryptographic algorithm may therefore be an algorithm of the masked DES type with masked key derivation or an algorithm of the masked AES type with masked key derivation.

The security of the data processing method is strengthened by this.

In another possible embodiment, the first cryptographic algorithm is a mobile telephony authentication algorithm.

In one example of the use of random values, the first cryptographic algorithm is masked by the first random value and the second cryptographic algorithm is masked by the second random value. This solution permits a particularly effective differentiation of the first datum and the verification datum in the event of an attack on each of the cryptographic algorithms by a fault of the same type.

The data processing method is for example implemented in a microcircuit card.

The invention also proposes a data processing device comprising means for generating a first random value, means for executing a first cryptographic algorithm using the first random value, involving in at least one calculation a first datum and generating an output datum from an input datum, means for generating a second random value, means for executing a second cryptographic algorithm using the second random value and generating a verification datum, and means for comparing the verification datum to the first datum for verification of the correct execution of the first algorithm.

The device is for example a microcircuit card.

The invention finally proposes a computer program comprising instructions adapted to implement the method evoked above when said instructions are executed by a microprocessor.

Other features and advantages of the invention will become apparent in the light of the following description, given with reference to the appended drawings, in which:

FIG. 1b shows one possible embodiment of the device from FIG. 1a;

Figure 1A:
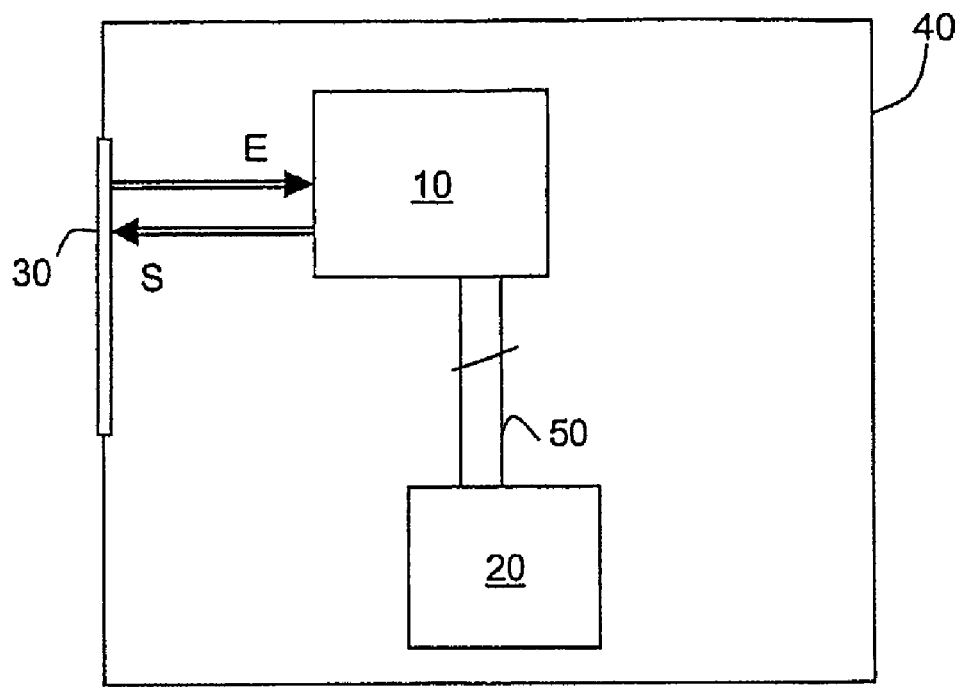
FIG. 1a represents diagrammatically a data processing device in which the invention is used.

FIG. 1a represents diagrammatically a data processing device 40 in which the present invention is used. This device 40 comprises a microprocessor 10 with which is associated a memory 20, for example by means of a bus 50. The data processing device 40, and specifically the microprocessor 10 that it incorporates, can exchange data with external devices by means of a communication interface 30.

There is shown diagrammatically in FIG. 1a the transmission of an input datum E received from an external device (not shown) and transmitted from the communication interface 30 to the microprocessor 10. In a similar manner it shows the transmission of an output datum S from the microprocessor 10 towards the communication interface 30 with as its destination an external device. Although, for the illustration, the input data E and the output data are shown by two separate arrows, the physical means that permit the communication between the microprocessor 10 and the interface 30 could be provided by single means, for example a serial communication port or a bus.

The microprocessor 10 is adapted to execute software that permits the data processing device 40 to execute a method according to the invention examples of which will be given hereinafter. The software comprises a series of command instructions to the microprocessor 10 that are stored in the memory 20, for example.

Alternatively, the microprocessor 10-memory 20 combination may be replaced by a specific application circuit which then comprises means for executing the various steps of the secure data processing method.

Figure 1B:
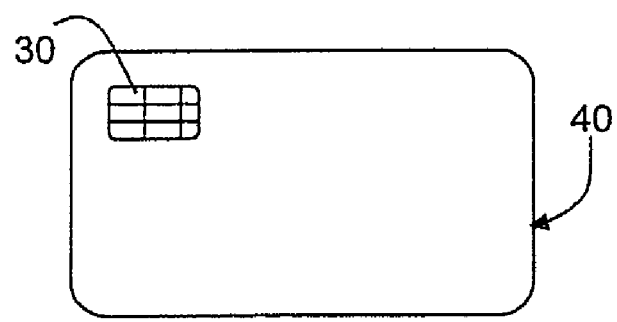

FIG. 1b shows a microcircuit card that constitutes a data processing device according to the invention as shown in FIG. 1a. The communication interface 30 is in this case provided by the contacts on the microcircuit card. The microcircuit card incorporates a microprocessor 10 and a memory 20 as shown in FIG. 1a.

Figure 2:
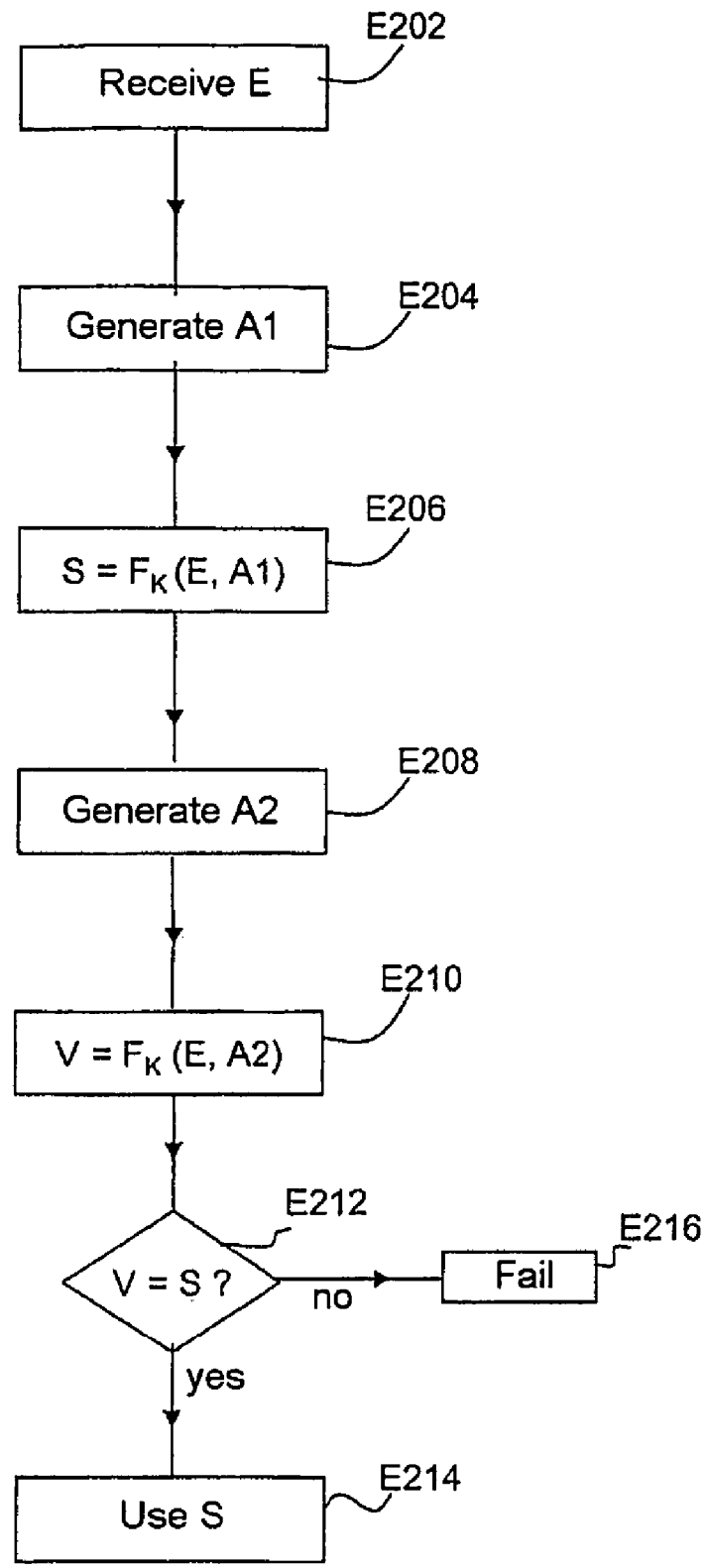
FIG. 2 shows a first embodiment of the method of the invention.

FIG. 2 represents in the form of a flowchart the steps of a first example of secure data processing method according to the invention.

The method begins in the step E202 in which the microprocessor 10 receives from the communication interface 30 an input datum E that must be processed by means of a cryptographic algorithm in the data processing device 40, and this to obtain an output datum S.

There is described here the case of a cryptographic algorithm in a general context; in practice, this cryptographic algorithm could permit for example an encryption, a decryption, a signing or an authentication of the input data.

When the input data E is received by the microprocessor 10 (step E202), the next step is a step E204 in which the microprocessor 10 generates a first random value A1.

The next step is then the step E206 in which there is applied to the input data E a cryptographic algorithm $F_K$ masked by means of the first random value A1. The cryptographic algorithm $F_K$ is for example a symmetrical key algorithm that uses a secret key K. In one possible embodiment it is an algorithm of the DES type. The use of the cryptographic algorithm $F_K$ in the step E206 is masked with for mask the first random value A1 generated in the step E204. For example, the mask used may be one or more mask(s) among those described in the patent applications WO 99/48239 and FR 2 820 577.

The application of the cryptographic algorithm $F_K$ to the input data E has for result the output data S. It may be noted that, for a given cryptographic algorithm F, the result (output data S) depends only on the input data E and the key K used and does not depend on the mask A1 (first random value)

used. As seen in the introduction, the mask A1 in fact permits modification of certain data and/or intermediate steps of the algorithm $F_K$ in order to complicate the detection of the secret key K, without however influencing the final result of the latter.

When the output data S has been obtained in the step E206, the next step is the step E208 in which the microprocessor 10 generates a second random value A2. Alternatively, the step E208 of generating a second random value A2 could be carried out at another time, for example at the time of generating the first random value A1 (step E204).

In all cases, the second random value A2 is generated in a random manner independently of the first random value A1 and will therefore generally be different from the first random value A1.

The next step is then the step E210 in which there is applied to the input data E the cryptographic algorithm $F_K$ already used in the step E206, using this time as the mask the second random value A2. The cryptographic algorithm $F_K$ applied to the input data E and masked by the second random value A2 gives for result a verification datum V.

As seen previously, the result of the cryptographic algorithm $F_K$ applied to the input data E does not depend on the mask (A1 or A2) used. In normal operation, the result obtained in the step E210 (verification datum V) with the mask A2 should therefore be equal to the result obtained in the step E206 (output datum S) with the mask A1. In normal operation, the verification datum V should therefore be equal to the output datum S.

This is why it is tested in the step E212 (that follows the step E210) if the verification datum V is indeed equal to the output datum S.

In the affirmative, i.e. if the comparison of the results of the respective cryptographic algorithms respectively applied in the steps E206 and E210 permits the assumption that the latter have been executed without faults, the next step is the step E214 in which the processing performed by the microprocessor 10 may therefore continue, for example using the output datum S obtained. In fact, it is assumed in this case that the execution of the cryptographic algorithm that permitted the obtaining of this output datum S was not the subject of an attack.

On the other hand, if it is determined in the step E212 that the verification datum V is different from the output datum S, the next step is the step E216 in which it is concluded that the secure algorithm for obtaining the output value S has failed. In fact, if the verification algorithm V is not identical to the output datum S, it is concluded that the execution of one of the cryptographic algorithms of the steps E206 and E210 has been interfered with, which generally reflects an attack by generation of faults.

The consequences of the failure of the secure method in step E216 may differ according to the applications. As a general rule, one would avoid using the output value S and/or communicating it to an entity external to the microcircuit card to prevent any possible fraudulent use of an output datum produced by means of a cryptographic algorithm whose execution has been interfered with.

It is further noted that the secure data processing method that has just been described is protected against attacks by faults in which the same faults would be applied to the steps E206 and E210. In fact, the use of a first random value A1 and a second random value A2, different from each other in the most general case, permits the involvement of different steps and/or different data in the successive executions of the cryptographic algorithm $F_K$ in the steps E206 and E210. Thus the same attack applied to these two steps will generate different results, which will then be detectable in the step E212 of comparison of the verification data V to the output data S.

The method described above is therefore not only protected against fault generation attacks, by means of the comparison of two different iterations of the cryptographic algorithm $F_K$, but also against fault generation attacks in which two identical faults are generated in succession, thanks to the masking of each iteration of the cryptographic algorithm by means of a different mask.

Figure 3:
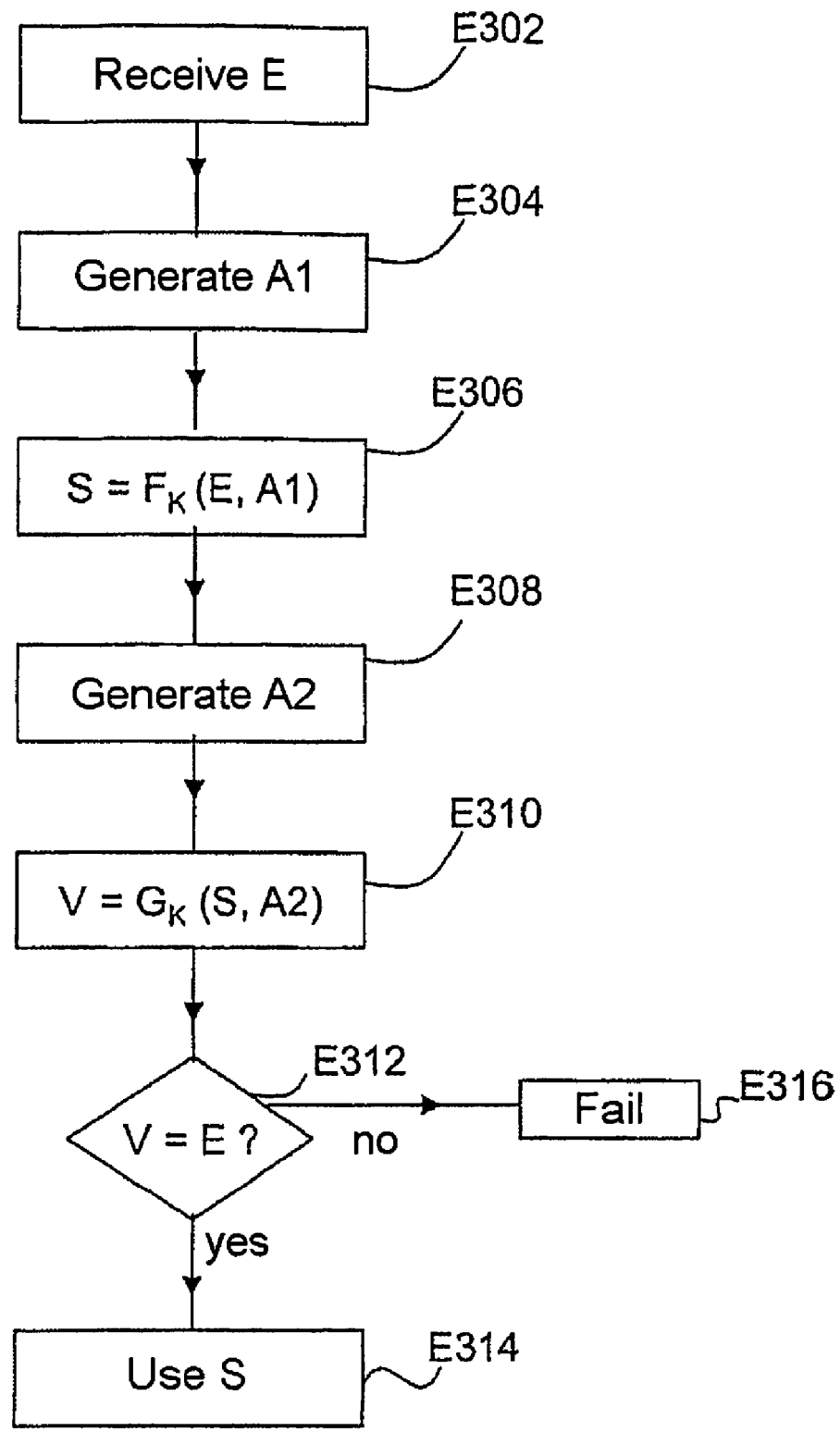
FIG. 3 shows a second embodiment of the method of the invention.

FIG. 3 describes a second embodiment of a secure data processing method according to the invention.

The method begins in the step E302 with the reception by means of the communication interface 30 of input data E by the microprocessor 10.

After reception of the input data E, the microprocessor 10 generates a first random value A1 in the step E304.

The microprocessor can then, in the step E306, apply to the input data E a cryptographic algorithm $F_K$ with symmetrical secret key K and masked by means of the first random value A1. In the example described, the cryptographic algorithm used is of the DES type the masking whereof can be effected during the derivation of the key, as described in the patent application FR 2 820 577.

The execution, masked by the first random value A1, of the cryptographic algorithm $F_K$, applied to the input data E, permits the obtaining of the output data S that normally constitutes the required result of the data processing method. However, in order to verify that the execution of the process has not suffered attack by generation of faults, the following steps are carried out that permit verification of the absence of faults during the execution of the cryptographic algorithm in the step E306.

Accordingly, the next step is the step E308 in which the microprocessor 10 generates a second random value A2.

The microprocessor then applies, in the step E310, a second cryptographic algorithm $G_K$, which is the inverse algorithm of the cryptographic algorithm $F_K$, to the output data S that has just been obtained. The second cryptographic algorithm $G_K$ is moreover masked by means of the second random value A2. This masking is for example effected by the masking of the step of deriving the key of the DES algorithm.

Normally, and particularly if the respective executions of the cryptographic algorithms $F_K$ and $G_K$ have not suffered attack by generation of faults, the result V of the application of the second cryptographic algorithm $G_K$, the inverse algorithm of the first cryptographic algorithm $F_K$, to the output data S is equal to the input data E. A difference between the result V of the second cryptographic algorithm $G_K$ and the input data E therefore indicates an error in at least one of the respective executions of the cryptographic algorithm $F_K$ and/or $G_K$ and consequently indicates a risk of attack by generation of faults.

One recalls that the masking of the cryptographic algorithms $F_K$ and $G_K$ by different masks (first random value A1 for the first cryptographic algorithm $F_K$ and second random value A2 for the second cryptographic algorithm $G_K$) does not modify the result of these cryptographic algorithms, but only some or all of the intermediate data and/or the steps executed in these algorithms.

The next step E312 therefore consists in verifying the equality of the result (or verification datum) V of the second cryptographic algorithm $G_K$ to the input datum E in order to detect any attack by generation of faults.

If it is determined in the step E312 that the verification datum V is not equal to the input datum E, which indicates a risk that the execution of the first cryptographic algorithm $F_K$ was attacked by generation of faults, the next step is the step E316 in which the microprocessor 10 considers the failure of the correct execution of the first cryptographic algorithm $F_K$ and consequently the non-availability of a secure output datum.

The consequence of the failure (step E316) naturally depends on the application envisaged and it generally consists in not using the output datum S calculated in the step E306.

If, on the other hand, it is determined in the step E312 that the verification datum V obtained by application of the second cryptographic algorithm $G_K$ is indeed equal to the input datum E, the method executed by the microprocessor 10 may continue normally, for example by using the output data S (step E314), since it is then assumed that the execution of the cryptographic algorithm was effected without error and consequently without attack by generation of faults.

It is noted also that the data processing method that has just been described is secured against particularly sophisticated fault generation attacks. In fact, an attacker may generate a fault in step p of the cryptographic algorithm $F_K$ (i.e. in round p in the case of the DES algorithm) and the complement of that fault in the step n-p of the cryptographic algorithm $G_K$ (n being the total number of steps in each of the algorithms), hoping to obtain by this means a verification datum V identical to the input datum E despite the error caused in the output datum S. However, thanks to the use of two different random values A1, A2, the faults will in fact always have different consequences depending on the algorithm concerned and the second algorithm would therefore not permit reverting to a verification datum V equal to the input datum E. The attack would therefore be detected.

The invention is naturally not limited to the two embodiments that have just been described. Among other things, the verification of the good execution of a cryptographic algorithm by comparison of the results of two cryptographic algorithms does not necessarily involve the input data or the output data. In fact, one could think of comparing an intermediate datum of the first cryptographic algorithm to a corresponding verification datum generated by the second cryptographic algorithm.

In the same order of ideas, although the cryptographic algorithms mentioned as examples in the foregoing description are of the DES type, the invention applies to other types of cryptographic algorithms, among others algorithms of the AES type, and the authentication algorithms for mobile telephony, such as those conforming to the GSM standard or to the UMTS standard.

The invention claimed is:

1. A secure data processing method executable by a microprocessor, comprising:
the microprocessor programmed to execute the steps of the method, the method comprising:
generating a first random value;
executing a first cryptographic algorithm using the first random value;
generating a second random value;
executing a second cryptographic algorithm using the second random value and generating a result permitting the verification of the correct execution of the first cryptographic algorithm, said second cryptographic algorithm being the inverse algorithm of the first cryptographic algorithm.

2. The secure data processing method according to claim 1, wherein the first cryptographic algorithm generates an output datum from an input datum, said result being a verification datum, comprising:
comparing the verification datum to the input datum for verification of the correct execution of the first cryptographic algorithm.

3. The secure data processing method according to claim 2, wherein the second algorithm is identical to the first cryptographic algorithm and is applied to the input datum and in that a first datum is the output datum.

4. The data processing method according to claim 2, wherein the first cryptographic algorithm is a cryptographic algorithm with a symmetrical key.

5. The data processing method according to claim 2, wherein the first cryptographic algorithm is an algorithm of the DES type or of the AES type.

6. The data processing method according to claim 2, wherein the first cryptographic algorithm is an algorithm of the DES type or of the AES type masked by means of the first random value.

7. The data processing method according to claim 2, wherein the first cryptographic algorithm is an algorithm of the masked DES type with masked key derivation of an algorithm of the masked AES type and with masked key derivation.

8. The data processing method according to claim 2, wherein the first cryptographic algorithm is a mobile telephony authentication algorithm.

9. The data processing method according to claim 1, wherein the first cryptographic algorithm is masked by the first random value and in that the second cryptographic algorithm is masked by the second random value.

10. The data processing method according to claim 2, wherein it is implemented in a microcircuit card.

11. A data processing device comprising
means for generating a first random value;
means for executing a first cryptographic algorithm using the first random value, involving in at least one calculation a first datum and generating an output datum from an input datum, the first datum being different from the input datum;
means for generating a second random value;
means for executing a second cryptographic algorithm using the second random value and generating a verification datum, such that executing said second cryptographic algorithm differs from executing said first cryptographic algorithm;
means for comparing the verification datum to the first datum for verification of the correct execution of the first cryptographic algorithm.

12. The data processing device according to claim 11, wherein the device is a microcircuit card.

13. A non-transitory computer readable storage medium with a computer program stored thereon comprising instructions adapted to implement the method according to claim 1, when said instructions are executed by a microprocessor.

14. The processing method according to claim 3, wherein the first cryptographic algorithm is a cryptographic algorithm with a symmetrical key.

15. The data processing method according to claim 3, wherein the first cryptographic algorithm is an algorithm of the DES type or of the AES type.

16. The data processing method according to claim 3, wherein the first cryptographic algorithm is an algorithm of the DES type or of the AES type with key derivation masked by means of the first random value.

17. The data processing method according to claim 3, wherein the first cryptographic algorithm is an algorithm of the DES type or of the AES type masked by means of the first random value.

18. The data processing method according to claim 3, wherein the first cryptographic algorithm is an algorithm of the masked DES type with masked key derivation of an algorithm of the masked AES type and with masked key derivation.

19. A secure data processing method executable by a microprocessor, the microprocessor programmed to execute the steps of the method, the method comprising:
generating via the microprocessor a first random value;
executing a first cryptographic algorithm using the first random value;
generating a second random value;
executing a second cryptographic algorithm using the second random value such that executing said second cryptographic algorithm differs from executing said first cryptographic algorithm, wherein said second cryptographic algorithm generates a result permitting the verification of the correct execution of the first cryptographic algorithm.

20. The secure data processing method according to claim 19, wherein executing the first cryptographic algorithm involves in at least one calculation a first datum and generates an output datum from an input datum, wherein said result is a verification datum, and comprising:
comparing the verification datum to the first datum for verification of the correct execution of the first cryptographic algorithm.

21. The data processing method according to claim 19, wherein the first cryptographic algorithm is masked by the first random value and in that the second cryptographic algorithm is masked by the second random value.

* * * * *

UNITED STATES PATENT AND TRADEMARK OFFICE
CERTIFICATE OF CORRECTION

PATENT NO.       : 8,386,791 B2                                            Page 1 of 1
APPLICATION NO. : 10/592070
DATED            : February 26, 2013
INVENTOR(S)      : Bevan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 349 days.

Signed and Sealed this
First Day of September, 2015

Michelle K. Lee
*Director of the United States Patent and Trademark Office*